United States Patent
Jeryan

[11] 3,712,056
[45] Jan. 23, 1973

[54] COMBUSTION CHAMBER FOR GAS TURBINE ENGINE

[75] Inventor: Richard A. Jeryan, Detroit, Mich.

[73] Assignee: Ford Motor Co., Dearborn, Mich.

[22] Filed: April 13, 1971

[21] Appl. No.: 133,643

[52] U.S. Cl. .................... 60/39.65, 60/39.74
[51] Int. Cl. .................................. F02c 7/00
[58] Field of Search ........... 60/39.65, 39.69, 39.74; 431/350

[56] References Cited

UNITED STATES PATENTS

| | | | |
|---|---|---|---|
| 2,447,482 | 8/1948 | Arnold | 60/39.65 X |
| 2,632,299 | 3/1953 | Loughran | 60/39.65 |
| 2,581,902 | 1/1952 | Bodine | 60/39.69 |

FOREIGN PATENTS OR APPLICATIONS 768,049  6/1955  Germany ............... 60/39.65

*Primary Examiner*—Carlton R. Croyle
*Assistant Examiner*—Michael Koczo, Jr.
*Attorney*—John R. Faulkner and Glenn S. Arendsen

[57] ABSTRACT

Fuel and air are combusted within a spherical combustion chamber and the combustion products flow radially outward through the porous wall of the combustion chamber into an outer housing where the combustion products mix with secondary air. The short residence time of the actual combustion process improves combustor efficiency and reduces undesirable exhaust emissions.

8 Claims, 1 Drawing Figure

PATENTED JAN 23 1973
3,712,056
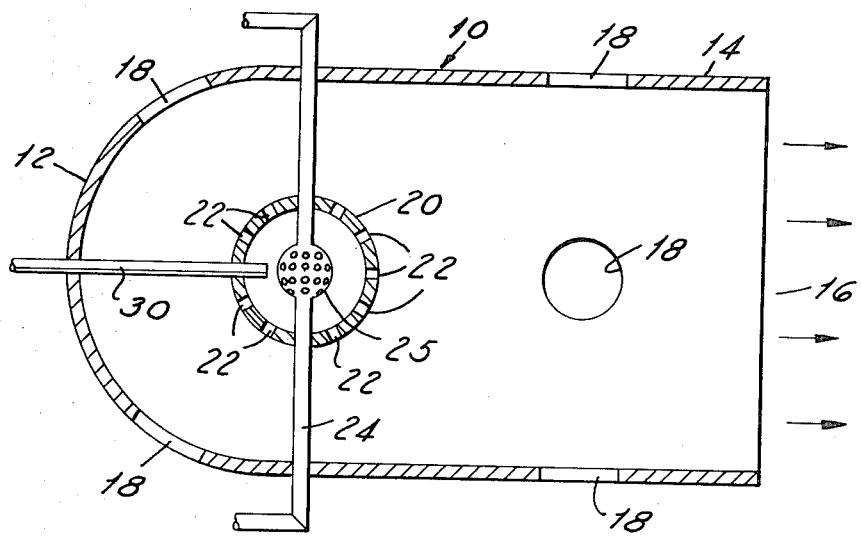
INVENTOR.
RICHARD A. JERYAN
BY
John R. Faulkner
Glenn S. Arendsen
ATTORNEYS

COMBUSTION CHAMBER FOR GAS TURBINE ENGINE

SUMMARY OF THE INVENTION

Recent studies have shown that the proportion of certain undesirable components such as oxides of nitrogen in engine exhaust gases increases with both the temperature and the time of the actual combustion process. These factors decrease the proportion of certain other undesirable components and increase the overall combustion efficiency, however, and automotive engineers have expended considerable effort in attempting to achieve a satisfactory balance of these conflicting considerations.

This invention provides a combustion chamber for a gas turbine engine that maximizes combustion efficiency with the reduction of undesirable components in the exhaust gases. The combustion chamber assembly comprises an outer housing having an entrance opening for admitting secondary air to its interior and an exit opening for conducting combustion gases out of its interior. An inner combustion chamber is located within the outer housing and has a plurality of openings in its wall connecting its interior with the interior of the outer housing. A mechanism for supplying fuel and air communicates with the interior of the inner combustion chamber and an ignitor is located within the inner combustion chamber for igniting the fuel-air mixture. The fuel-air mixture burns with a high intensity within the inner combustion chamber and the combustion products pass through the openings of its wall into the outer combustion chamber where the combustion products mix with secondary air. Upon exiting from the outer combustion chamber, the mixture flows to other engine components such as the turbine wheel.

An inner combustion chamber having a spherical shape produces a high overall combustion efficiency and a low proportion of undesirable emissions. A large number of small openings are spaced evenly in the wall of the spherical combustion chamber to conduct combustion products into the outer combustion chamber. The combustion chamber can be made of ceramic material such as silicon nitride, silicon carbide, alumina, glass ceramics, etc., or of other high temperature materials. Metals cooled by air, fuel, or other techniques might be useful in certain applications.

Porous materials that eliminate the need for some or all of the small openings also can be used. The size and number of the holes or the degree of porosity usually must be determined empirically depending on engine size, fuel type, and maximum power output.

A tube extending through the inner combustion chamber substantially on a diameter thereof has a plurality of holes communicating with the interior of the spherical combustion chamber. Fuel and air is supplied to the tube which in turn supplies the fuel-air mixture to the spherical combustion chamber. An ignitor extends into the combustion chamber to ignite the fuel-air mixture as it leaves the tube. Tube diameter is reduced by extending the tube completely through the inner chamber and supplying fuel and air to both ends of the tube. The central portion of the tube preferably is enlarged and the holes are located therein to improve fuel-air distribution.

BRIEF DESCRIPTION OF THE DRAWING

The drawing is a sectional view of a combustion chamber assembly of this invention showing the fuel and air supply tube, the ignitor, and the relationship of a spherical inner combustion chamber to the outer housing. Supporting struts for the inner combustion chamber have been eliminated from the drawing for clarity.

DETAILED DESCRIPTION

Referring to the drawing, an outer housing 10 comprises a hemispherical forward portion 12 connected to one end of a cylindrical portion 14. The other end of cylindrical portion 14 is open to provide an exit 16 for the combustion products. Exit 16 communicates with the engine turbine wheels (not shown). A plurality of entrance openings 18 are formed in both the hemispherical portion and the cylindrical portion of outer housing 10 for admitting air to the interior of housing 10.

A spherical inner combustion chamber 20 is located within housing 10 near the forward end thereof. Combustion chamber 20 has a plurality of small openings 22 in its spherical wall that connect the interior of the combustion chamber with the interior of outer housing 10. Inner combustion chamber 20 is made of an impervious silicon nitride ceramic material.

A tube 24 extends entirely through combustion chamber 20 substantially on a diameter thereof. The portion of tube 24 in the center of combustion chamber 20 is enlarged into a spherical shape 25 that contains a plurality of small openings 26 connecting the interior of the tube with the interior of the combustion chamber. Tube 24 can be made of stainless steel or other high temperature materials and can provide all of the support for combustion chamber 20 if desired. Alternatively, struts connecting the combustion chamber with outer housing 10 are provided to support the combustion chamber. An ignitor 30 extends into combustion chamber 20 substantially at a right angle to tube 24. Ignitor 30 typically is of the electrical type and its contacts are located within the interior of combustion chamber 20.

During operation, fuel and air are supplied through both sides of tube 24 to the interior of combustion chamber 20. Ignitor 30 provides the initial ignition energy for igniting the fuel-air mixture within the combustion chamber. The mixture continues to burn as it flows radially outward from holes 22 and, because of the intense heat concentration provided by the wall of the combustion chamber, the mixture is completely combusted by the time it reaches the wall of combustion chamber 20. As the combustion products flow through holes 22, secondary air supplied to the interior of outer housing 10 through openings 18 mixes therewith to quench the combustion products below the temperature at which undesirable components such as oxides of nitrogen are formed. The resulting mixture flows out of exit 16 to the engine turbine in a conventional manner.

For illustrative purposes, an inner combustion chamber having an outside diameter of 3.1 inches and a wall thickness of 0.1 inch has 96 spaced one-fourth inch holes therein. Tube 24 has an outside diameter 0.50 inch and a wall thickness of 0.032 inch. Spherical portion 25 of the tube is 0.80 inch in diameter and contains 40 holes having a diameter of 0.060 inch. The chamber performs effectively in a gas turbine engine rated at 210 horsepower.

A large plenum chamber can be used as the outer housing if desired. The fuel-air supply tube can extend into the inner combustion chamber from one side only.

Thus this invention provides a combustion chamber for a turbine engine that operates at high efficiency and minimizes undesirables such as nitrogen oxides in the exhaust gases thereof. The exhaust gases also are virtually free of unburned hydrocarbons and smoke because of the high intensity combustion.

I claim:

1. A combustion chamber assembly for a gas turbine engine comprising an outer housing having an entrance opening for admitting secondary air to its interior and an exit opening for conducting combustion gases out of its interior, an inner combustion chamber located within said outer housing, said inner combustion chamber having a spherical construction, said inner combustion chamber having a plurality of openings connecting its interior with the interior of the outer housing, fuel and air supply means for supplying fuel and air to the center portion of the inner combustion chamber, and, ignition means located within said inner combustion chamber for igniting the fuel-air mixture within the inner combustion chamber, said ignited fuel-air mixture being quenched upon passing through said openings in the inner combustion chamber.

2. The assembly of claim 1 in which the spherical combustion chamber is a porous ceramic material.

3. The assembly of claim 2 in which the fuel and air supply means comprises a tube extending through the inner combustion chamber substantially on a diameter thereof, said tube having a plurality of openings through which fuel and air are supplied to the inner combustion chamber.

4. The assembly of claim 3 in which said tube comprises an enlarged portion located within the inner combustion chamber, said plurality of openings in said tube being located in said enlarged portion.

5. The assembly of claim 4 in which the enlarged portion of the tube is spherical.

6. The assembly of claim 1 in which the fuel and air supply means comprises a tube extending through the inner combustion chamber, said tube having a plurality of openings through which fuel and air are supplied to the inner combustion chamber.

7. The assembly of claim 6 in which said tube comprises an enlarged portion located within the inner combustion chamber, said plurality of openings in said tube being located in said enlarged portion.

8. The assembly of claim 7 in which fuel and air are supplied to the enlarged portion of the tube through both ends of the tube.

* * * * *